(12) United States Patent
Portmann

(10) Patent No.: US 6,382,232 B1
(45) Date of Patent: May 7, 2002

(54) REMOTE TRIGGERING SYSTEM AND RETROFIT KIT FOR THERMAL-PRESSURE RELIEF DEVICES

(75) Inventor: Heinz Portmann, Calgary (CA)

(73) Assignee: Dynetek Industries Ltd., Calgary (CA)

( * ) Notice: Subject to any disclaimer, the term of this patent is extended or adjusted under 35 U.S.C. 154(b) by 0 days.

(21) Appl. No.: 09/801,821

(22) Filed: Mar. 9, 2001

(51) Int. Cl.⁷ ................................................ F16K 17/38
(52) U.S. Cl. .................... 137/68.13; 137/72; 137/79; 102/275.1; 102/275.5
(58) Field of Search ................ 137/68.11, 72, 137/73, 79; 102/275.1, 275.5

(56) References Cited

U.S. PATENT DOCUMENTS

| | | |
|---|---|---|
| 4,664,033 A | * 5/1987 | Burkdoll et al. ......... 102/275.2 |
| 4,827,962 A | 5/1989 | Picton |
| 5,217,244 A | 6/1993 | Bauer |
| 5,285,728 A | 2/1994 | Dolivet |
| 5,443,286 A | 8/1995 | Cunningham et al. |
| 5,762,091 A | 6/1998 | Sarné et al. |
| 5,848,604 A | 12/1998 | Eihusen |

OTHER PUBLICATIONS

Fireworks And Electric Ignition Supplies www.skylighter.com/ignition/htm.

* cited by examiner

*Primary Examiner*—John Rivell
(74) *Attorney, Agent, or Firm*—Sean W. Goodwin

(57) ABSTRACT

A heat-responsive fuse cord is positioned in the proximity of a pressure vessel and is thermally coupled to a thermal-pressure relief device which is in communication with the pressurized contents of the vessel. When ignited the fuse cord burns to a thermal coupler, transferring the heat to the thermal actuator of the TPRD. In a kit form, fuse cord and a thermal coupler provide an economical remote and retrofit triggering system for TPRD's having an otherwise limited environment of influence.

25 Claims, 9 Drawing Sheets

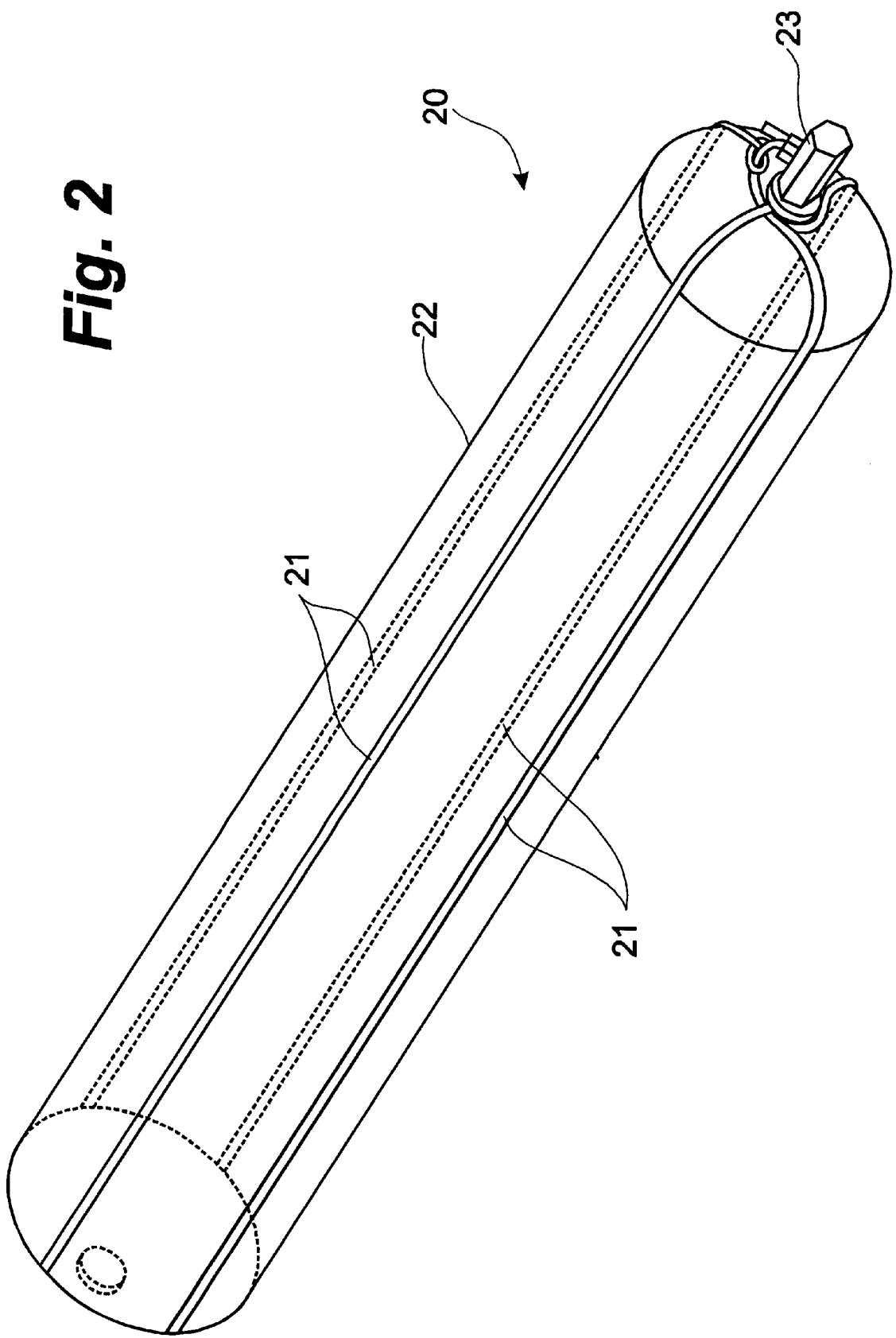

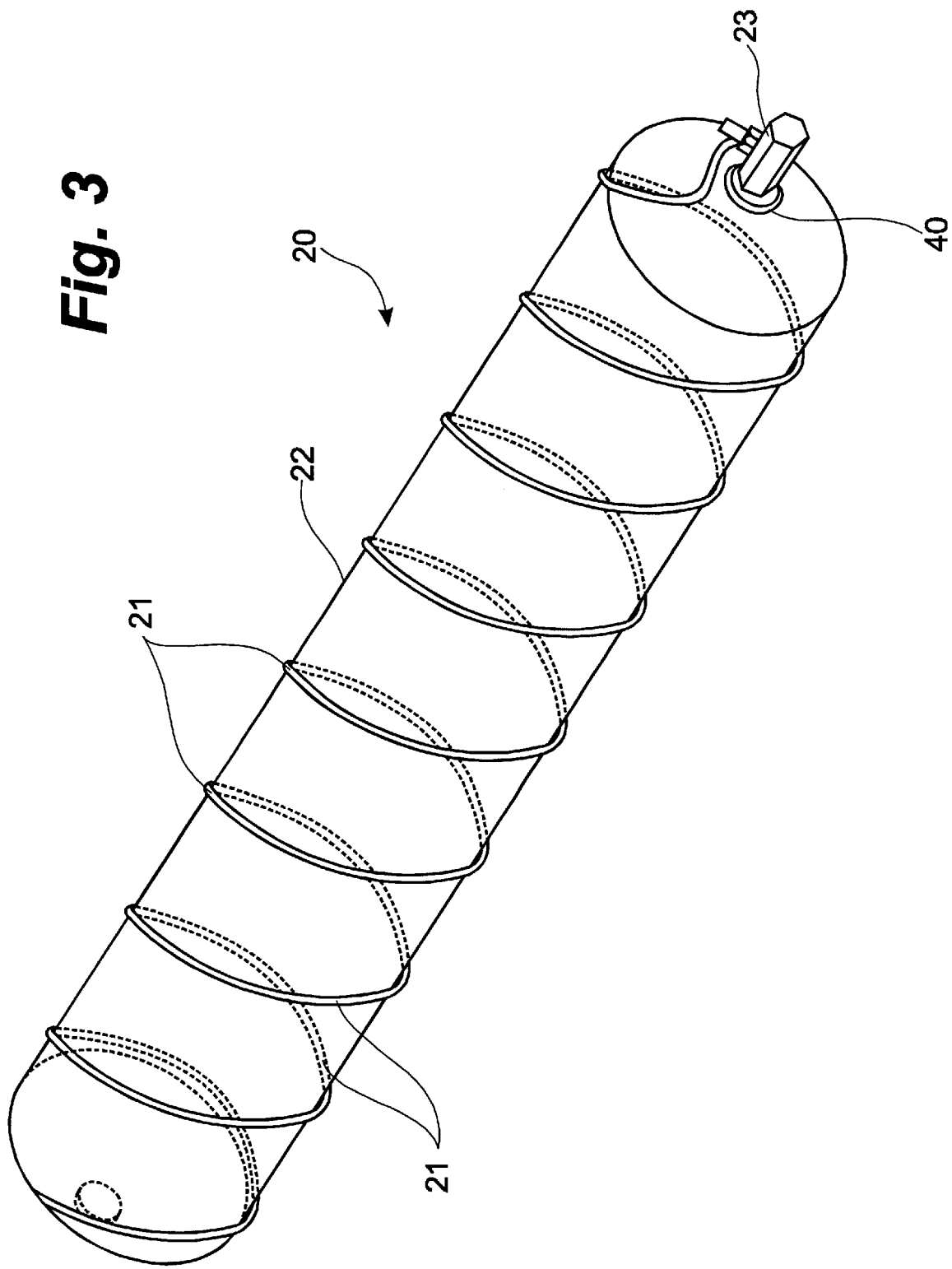

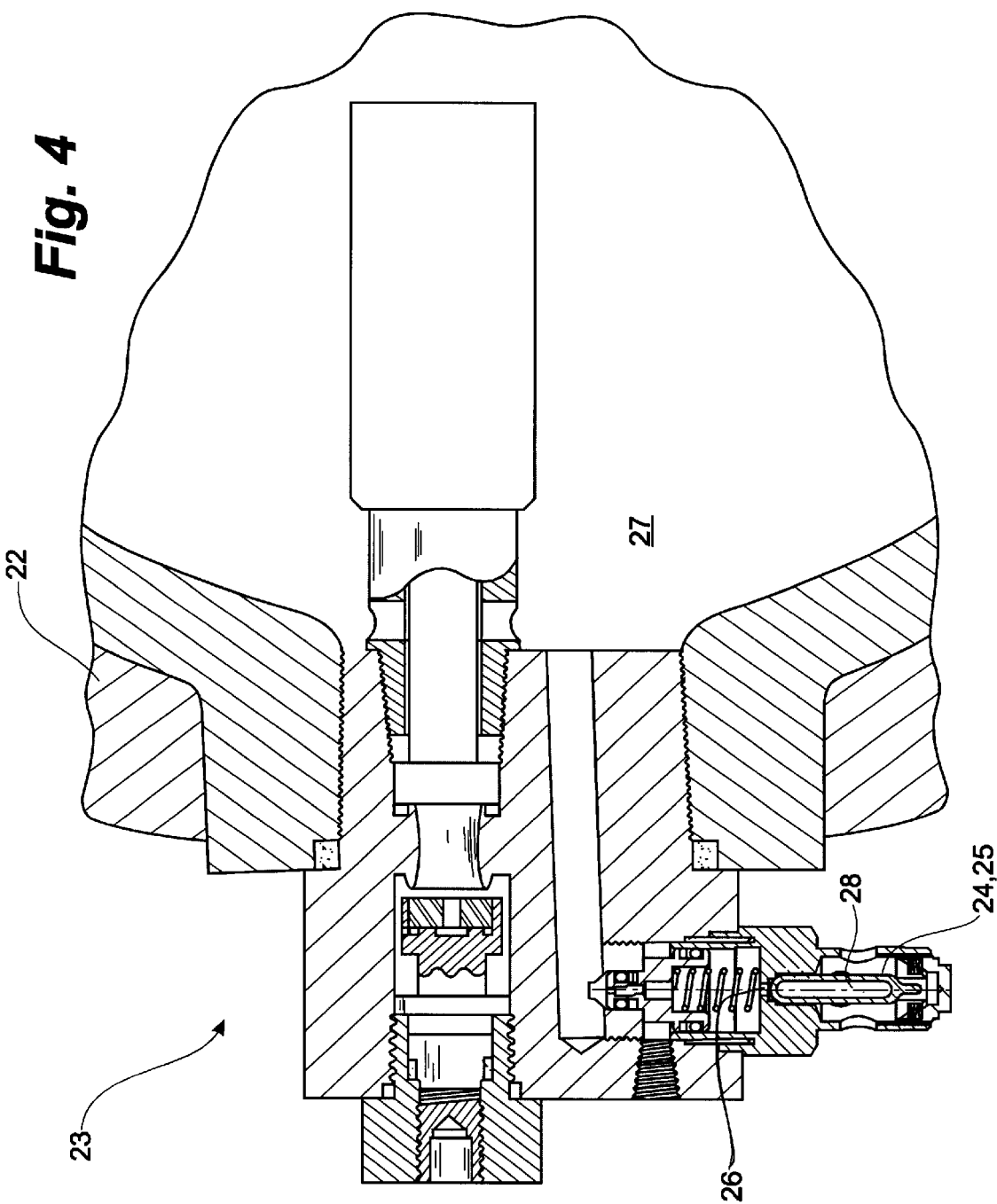

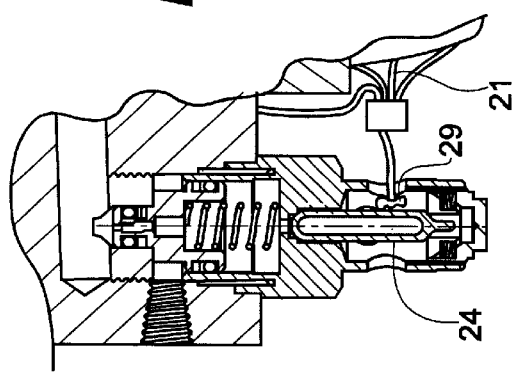
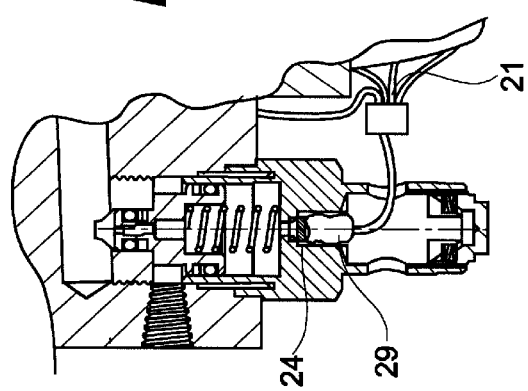
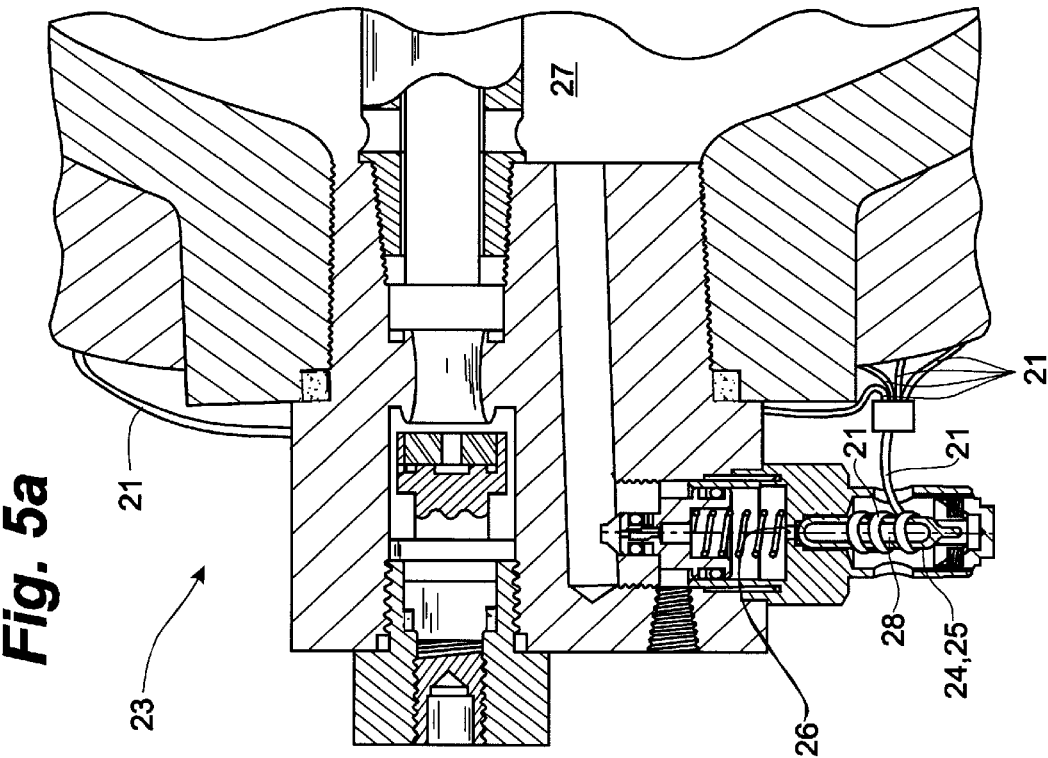

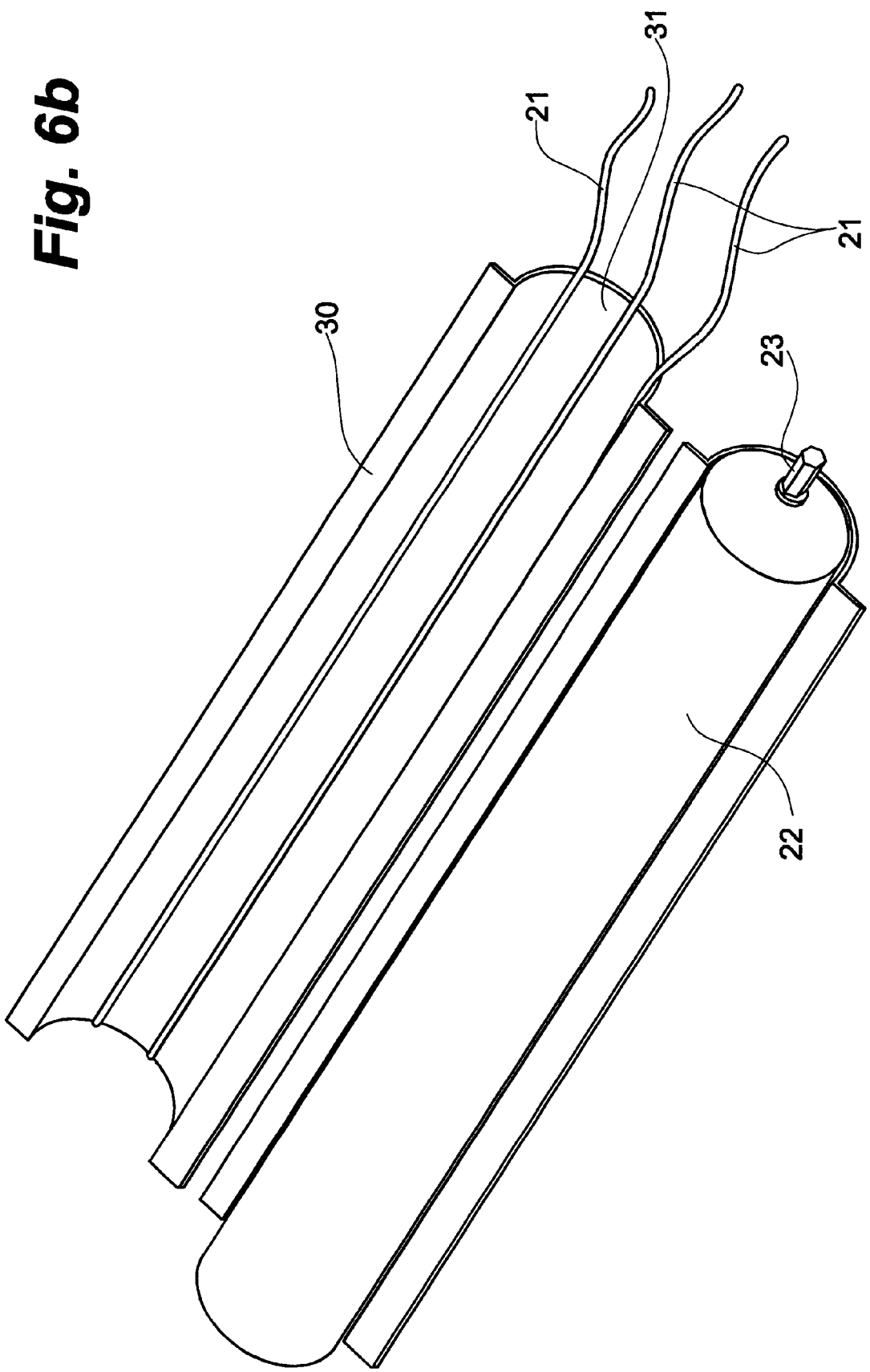

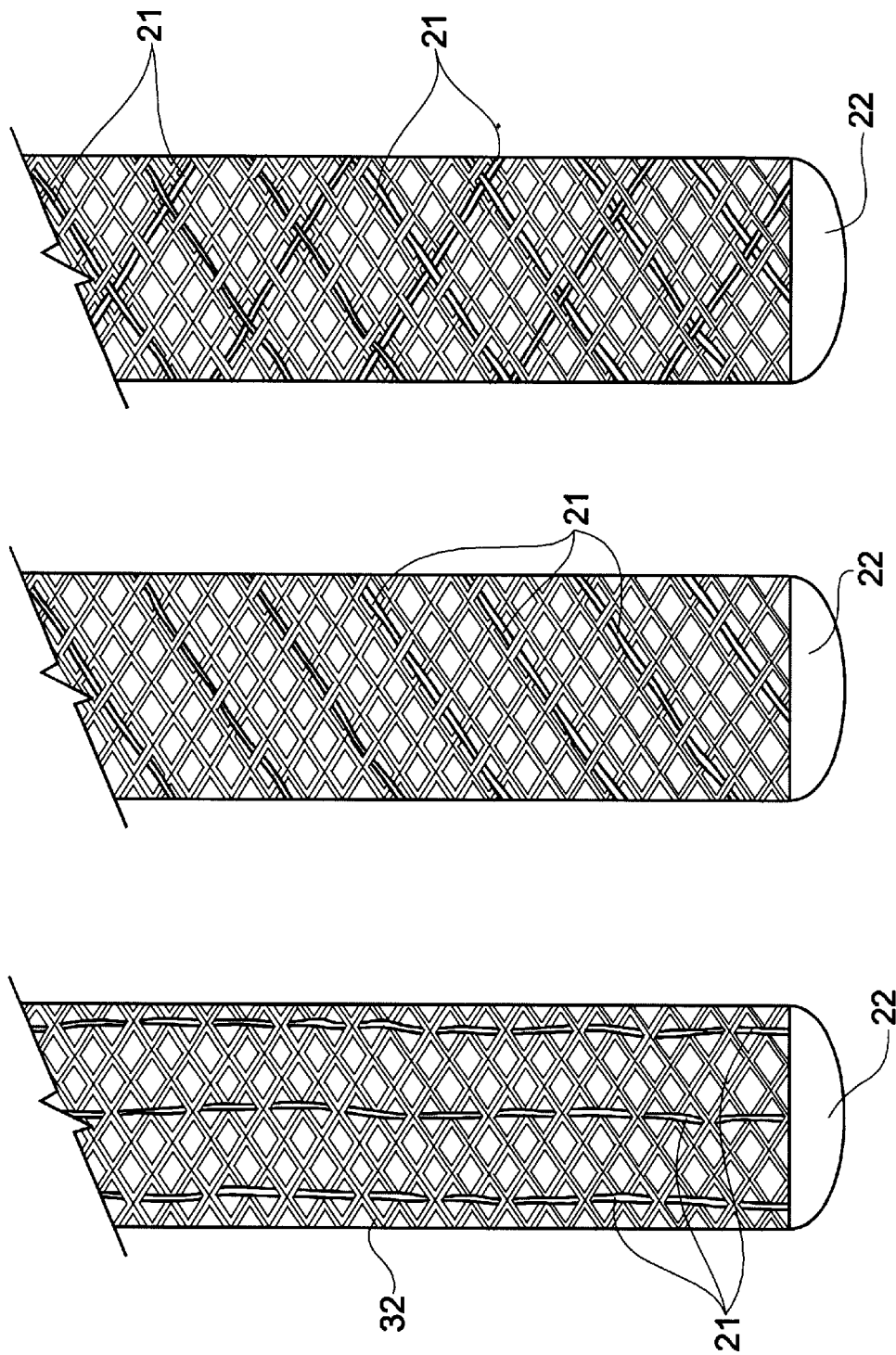

REMOTE TRIGGERING SYSTEM AND RETROFIT KIT FOR THERMAL-PRESSURE RELIEF DEVICES

FIELD OF THE INVENTION

The invention relates generally to the art of safety devices for pressure vessels and particularly to thermal-triggered actuation of relief devices for pressure vessels containing compressed gases.

BACKGROUND OF THE INVENTION

Pressure vessels, such as those designed to contain compressed natural gases for use as vehicular fuel vessels, are equipped with pressure relief devices (PRD) which communicate with the interior of the vessel and, when actuated, act to vent the gases from the interior to decrease the pressure in the vessel or to route the gases safely away from the vehicle. Unfortunately, in the rare instances of fire or other localized heat event, pressure relief devices alone can be inadequate.

A variety of PRD's are known and can be actuated thermally, by pressure, or by a combination of both. In the case of thick-walled metal vessels which have reasonably long endurance to elevated temperature, PRD's which are actuated by pressure, are most commonly used. In the case of thinner, lighter pressure vessels used for fuel vessels temperature endurance is of concern. In such cases, pressure rarely builds to beyond containable levels before localized structural integrity is compromised. For this reason, fuel vessels are protected by thermally activated PRD's or TPRD's.

One such TPRD is disclosed in U.S. Pat. No. 6,006,774 to Lhymn et al, in which a creep-resistant, leakage free melt plug is formed from a low-melting matrix alloy dispersed with reinforcing agents. The low-melt alloy, when exposed to elevated temperatures such as from a fire, melts and allows gases to be vented through a connected venting tube.

Other thermally responsive safety valves, such as that taught in U.S. Pat. No. 4,827,962 to Rolfsen, use a gas and liquid filled vial located against a seat which normally blocks the outlet. The vial is frangible when heated to a predetermined temperature. When the vial breaks, the seat is permitted to be removed, causing the outlet to open, venting the interior before structural integrity is lost or pressures can build to explosive proportions.

In the case where vessels are long, such as in vehicular fuel vessels, problems arise because localized heat sources may be applied at locations remote or insulated from a TPRD, thereby resulting in localized rupture of the vessel without ever affecting or actuating the TPRD. This is especially true when portions of the vessel, often the end of the vessel carrying the TPRD and fill valves are physically separated or insulated from the reminder of the vessel by insulation or by the frame or chassis of the vehicle.

A recent newsworthy event in Canada graphically illustrates this problem. A stolen CNG-powered van was vandalized and it's interior set afire. The steel fuel vessel, located in the chassis of the vehicle, was equipped with a single TPRD in the fill boss at the end of the vessel, which protruded outside of the vehicle. Because the temperature outside the vehicle remained below the actuation temperature of the TPRD it never did actuate. However, the extreme temperatures inside the van caused the vessel to fail and it's contents to ignite explosively due to localized failure of the vessel. The explosion and fire resulted in loss of property and the potential of a loss of life.

In Canada, there is a requirement that vessels be fire tested, however the regulations for testing do not take into consideration that occasionally vessels are exposed to damaging localized heating which does not necessarily actuate the TPRD's. Canadian Standards Association regulation B51-97 does require that all pressure vessels be tested with a uniform fire source every 1.65 m in length, providing direct flame impingement on the cylinder surface across its entire diameter so as to make sure that specified test temperatures are maintained.

Attempts have been made to resolve the problem related to fires at remote locations on the vessel relative to the TPRD. Most commonly, multiple TPRD's and various pipes, conduits and associated venting lines have been located at a plurality of locations along the length and about the surface of the vessel in an attempt to cause actuation of the TPRD regardless the location of the fire. This has resulted in a significant increase in cost, both in manufacturing and assembly. Further, additional TPRD's and their associated piping add significantly to the bulk of the vessel.

U.S. Pat. No. 5,848,604 to Eihusen attempts to resolve the problem by positioning a heat pipe substantially the length of the vessel from one polar end to the other and attached to a single TPRD at one end of the vessel. The pipe is designed to transmit heat as a result of a fire from a remote location on the vessel directly to the TPRD. The outer casing of the pipe is made from a thermally conductive metal such as copper, nickel or stainless steel and is lined with a wicking material, which operates on capillary action. The inside of the pipe is filled with a vaporizable fluid. When heat is applied to the pipe, the fluid, which has permeated the wicking material by capillary action, vaporizes and moves through the central core of the pipe, repeatedly condensing and vaporizing as it travels toward the PRD, until it transfers the heat to the PRD and actuates it.

To prevent serious injury or loss of property due to explosive ignition of compressed gases from failed vessels, as a result of fire, an economical and sensitive triggering mechanism must be provided and must ideally result in actuation of the PRD regardless of the location of the fire about the surface of the vessel and must do so in as short a time as possible.

SUMMARY OF THE INVENTION

The present invention provides a system for remote triggering of one or more thermal-pressure relief devices, the system being rapidly responsive to heat produced by a fire and the like.

More particularly, and as applied to a pressure vessel, a heat responsive fuse cord and ignitable by flame or heat, is positioned in the proximity of a protected pressure vessel and is thermally coupled to a thermal-pressure relief device (TPRD) which is in communication with the pressurized contents of the vessel. When ignited, as a result of localized flame or heat such as in a fire, the fuse cord burns to the TPRD, transferring the heat directly through a thermal coupler or through an intermediate initiator for actuating the TPRD. A kit comprising fuse cord and a thermal coupler provide an economical remote triggering system for TPRD's having an otherwise limited environment of influence. A variety of forms of attachment can be provided to ensure the fuse cord remains in the proximity of the vessel.

BRIEF DESCRIPTION OF THE DRAWINGS

FIG. 2 is a perspective view of the present invention wherein a plurality of lengths of fuse cord are positioned longitudinally onto the surface of the vessel;

FIG. 3 is a perspective view of a preferred embodiment of a thermally responsive pressure relief system of the present invention wherein the fuse cord is helically wrapped about the vessel.

FIG. 4 is an isolated section view of a frangible bulb of a thermally responsive pressure relief device;

FIG. 5a is an isolated section view of the fuse cord thermally coupled directly to the frangible bulb fuse of the thermal pressure relief device;

FIG. 5b is an isolated section view of the fuse cord thermally coupled to an initiator placed adjacent the frangible bulb of the thermal pressure relief devices;

FIG. 5c is an isolated section view of the fuse cord thermally coupled to an initiator placed adjacent an alternative thermal actuator, a frangible disc, of the thermal pressure relief device;

FIG. 6b is a perspective view of the insulated jacket and fuse cord of FIG. 6a, the insulated jacket in an open position; and FIGS. 7a–7c are perspective views of one embodiment of a thermally responsive pressure relief system of the present invention wherein the fuse cord is interwoven in a mesh sleeve and represent three examples of a plurality of possible patterns.

DETAILED DESCRIPTION OF THE PREFERRED EMBODIMENT

Figure 1A:
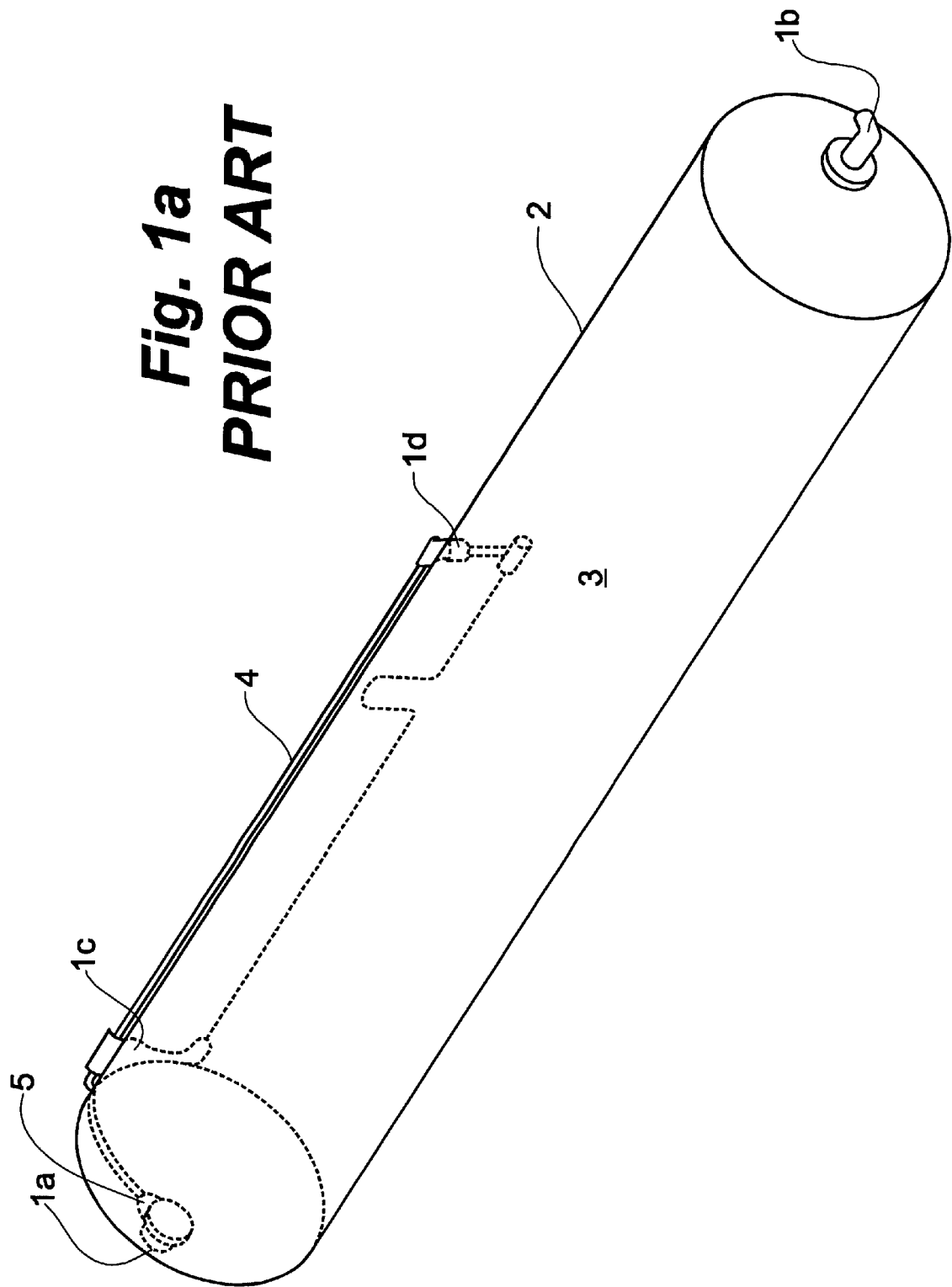
FIG. 1*a* is a perspective view of a pressure vessel equipped with a prior art thermally responsive pressure relief system wherein pressure relief devices are positioned at one or more polar ends and optionally along the length of the pressure vessel using high pressure line.
Figure 1B:
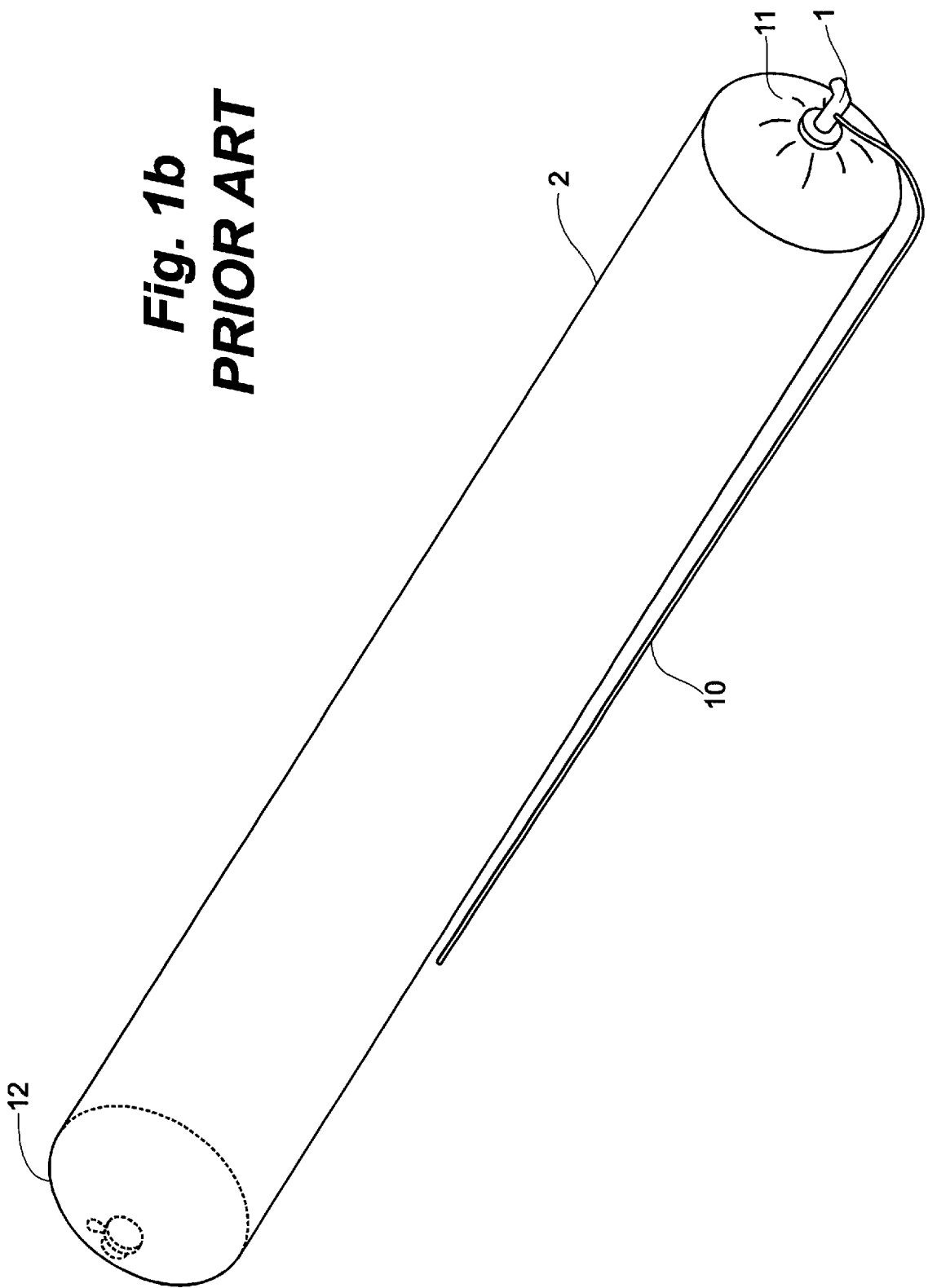
FIG. 1b is a perspective view of a pressure vessel equipped with a prior art thermally responsive heat pipe pressure relief device.

Having reference to FIGS. 1a and 1b, prior art thermally responsive pressure relief systems for a pressure vessel are shown. A thermally responsive pressure relief device (TPRD) 1a, 1b, 1c, 1d is located at any given location on a high pressure vessel 2 and communicates with the interior 3 of the vessel 2 for venting the high pressure contents in response to excessive heat. As shown in FIG. 1a, a number of PRD's 1a, 1b, 1c, 1d are positioned along the length of the vessel 2 and communicate with the interior 3 of the vessel 2 via a common high pressure line 4 extending from a polar boss 5.

In another prior art case, as shown in FIG. 1b, a single heat pipe 10, made from high thermal conductivity metal with a liner of wicking material and containing a vaporizable fluid, thermally coupled to the PRD 1, extends the length of the vessel 2, parallel to the axis of the vessel 2 and from one polar end 11 towards a second polar end 12, at a single location on the surface of the vessel 2.

Turning to the present invention, FIGS. 2 and 3 show a thermally responsive pressure relief system 20. Heat-actuated fuse cord 21 is positioned in the proximity of the surface of a high pressure vessel 22. The fuse cord 21 can be positioned so as to intercept and trigger a TPRD 23 from a heat source near, or at a location along the vessel 22. Several examples of various positioning options include: either extending from a remote location to the TPRD 23; extending from a plurality of positions on the surface of the vessel 22 (FIG. 2); and helically wrapped with one or more lengths of a fuse cord 21 (FIG. 3). The fuse cord 21 is thermally coupled to TPRD 23 located on the pressure vessel 22. Preferably, the fuse cord 21 is directly thermally coupled to the TPRD 23 or alternatively, the fuse cord 21 is coupled to an intermediate thermal initiator sufficient to activate TPRD's 23 having a greater thermal capacity.

In one type of TPRD 23, as shown in FIG. 4, a thermal actuator 24 is provided in the form of a frangible bulb 25, sealably positioned against an aperture 26 in the TPRD 23 that communicates with the normally-pressurized interior 27 of the vessel 22. The bulb 25, filled with alcohol 28 or other thermally responsive fluid, expands rapidly when exposed to heat, such as that provided by the burning thermally-coupled fuse cord 21, the expansion causing the bulb 25 to break and the aperture 26 to open, triggering venting of the gas within the vessel 22 to the atmosphere.

Other forms of thermal actuators 24 for TPRDs 23 include fusible plugs or a blowout disc (such as disclosed in U.S. Pat. No. 5,762,091 to Sarne et al and U.S. Pat. No. 5,435,333 to Duvall) secured with a temperature responsive amalgam.

Having reference to FIGS. 5a–5c, the free ends of the fuse cord 21 are coupled to the thermal actuator 24 either directly or to an initiator 29. Initiators 29 include a combustible charge such as a chemical match head (e.g. a known combination of potassium chlorate and phosphorous trisulphate) or a slower burn, high heat fuse cord, positioned about the thermal actuator 24 which and, when ignited by the fuse cord 21, provides sufficient heat for a duration capable of actuating the TPRD 23. This thermal coupling ensures that heat is transferred from the burning fuse cord 21 to the thermal actuator 24, resulting in reliable actuation of the TPRD 23. Use of an intermediary initiator 29 can multiply the heat release beyond that of the fuse cord 21 alone and can be used to activate frangible bulb fuses 25 and other TPRD's 23 having actuators 24 with higher heat capacity.

Heat-actuated fuse cord 21 is generally comprised of a core of a non-detonating pyrotechnic chemical mixture wrapped in a covering such as nitrocellulose or plastic, which is water-resistant. A variety of pyrotechnic fuse cords are commercially available or can be custom-made, if required. One such fuse is Visco GN1000, GN1001, or GN2000, having a linear burning velocity of approximately 1 cm per second, and another is Black match or Quick Match igniter cord having a linear burning velocity of meters per second, all available from Skylighter, Inc. Round Hill, Va. USA. The nature of the chemical composition can be varied to alter the burning velocity from inches per second to meters per second depending upon the needs. The primary requirement of the fuse cord 21 is its ability to be actuated by direct flame or excessive heat, such as in a fire situation.

In another embodiment of the invention, a kit is provided for the purposes of retrofitting existing pressure vessels 22 with remotely triggered TPRD's 23. One form of the kit consists of one or more lengths of fuse cord 21 and means with which to apply it. Application means include tie wire, tape, or tape strips with a peel and stick backing so as to enable attachment to or in the proximity of the vessel 22 or the surrounding environment. The fuse cord strips 21 are provided with thermal couplers, attached along or at the ends of the fuse cord 21 for direct thermal coupling to the existing TPRD 23 or to an intermediate initiator 29 capable of actuating the thermal actuator of the TPRD 23.

Figure 6A:
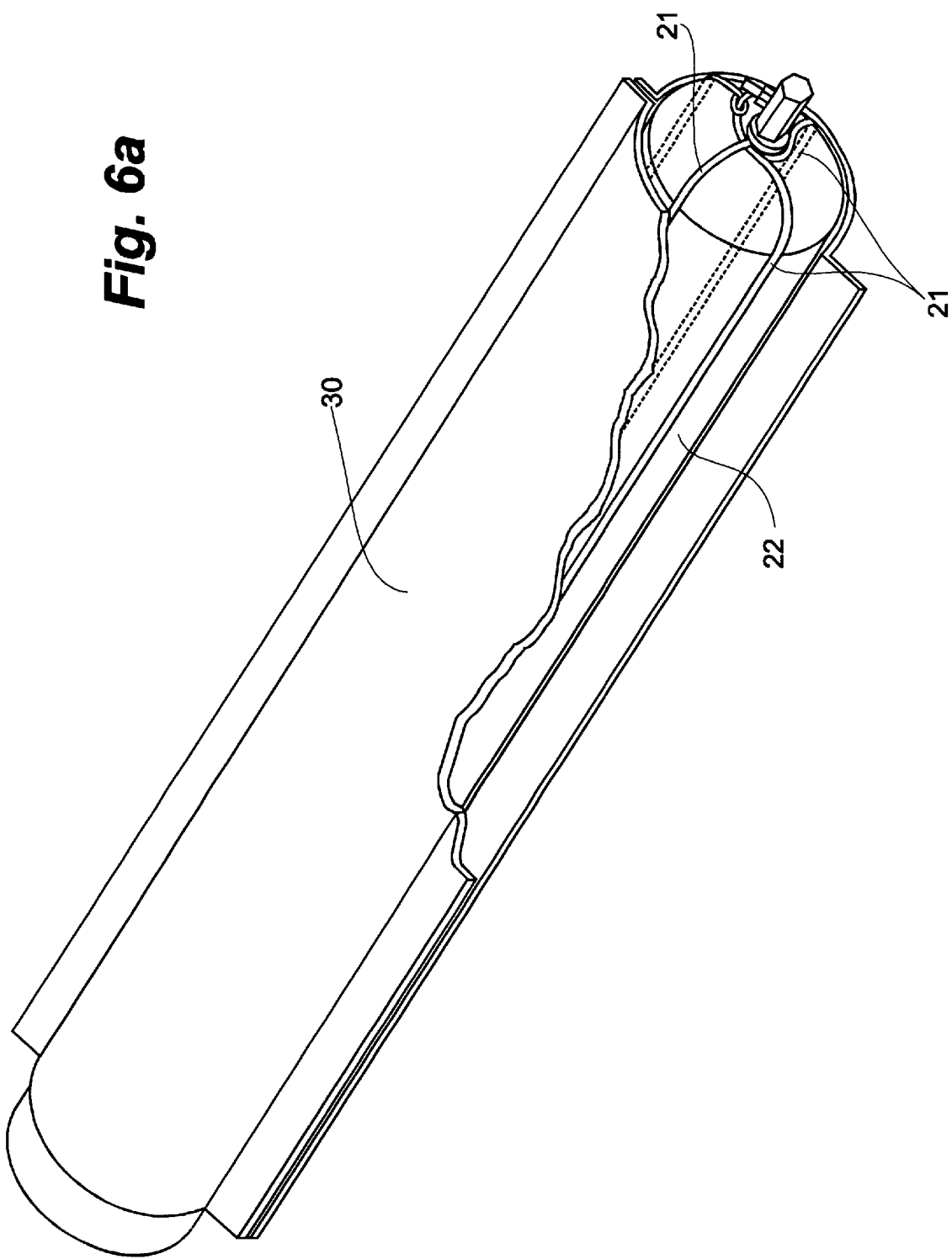
FIG. 6a is a partially cut away perspective view of one embodiment of a thermally responsive pressure relief system of the present invention wherein the fuse cord is placed between an insulating jacket and the external surface of the vessel.

In yet another embodiment of the invention, as shown in FIGS. 6a–6b, strips of fuse cord 21 are either taped or otherwise attached to a jacket of insulation 30 used to enclose and insulate a vehicular fuel vessel 22. Several lengths of fuse cord 21 are placed at a plurality of positions about the surface 31 of the insulated jacket 30. Once the insulated jacket 30 is placed about the vessel, free ends of the fuse cord are thermally coupled to the TPRD. Insulation, while used to protect the vessel 22 from excessive heat can, in some circumstances such as localized heat, prevent or delay the heat from being transferred to the TPRD 23. The placement of fuse cord 21 between the insulation 30 and the vessel 22 ensures that excessive heat, once it has penetrated the insulation 30, will rapidly trigger the TPRD 23 before vessel 22 integrity is compromised. Location of the fuse cord 21 on the outside of the insulation 30 (not shown) increases thermal sensitivity, but can result in unnecessary activation in occasional instances.

Further still, in another embodiment of the invention as shown in FIGS. 7a–7c, fuse cord 21 can be interwoven or otherwise incorporated into an expandable sleeve 32 in any of a plurality of mesh patterns. Free ends of the fuse cord 21 are thermally coupled to the TPRD 23. The mesh sleeve 32 is expandable to fit the girth of a variety of vessels 22 and can be manufactured in lengths which can be cut to fit individual vessel lengths. Fuse cord 21 can be pre-woven into the mesh or woven into the mesh immediately prior to the vessel 22 being put into service allowing for the pattern to be customized to the vessels use.

In yet another embodiment of the invention, again as shown in FIG. 3, the high pressure vessel 22 is a resin embedded fiber-reinforced vessel 22 for storing compressed natural gas or the like, comprising helically-wrapped resin embedded fibers over a metal liner. One or more lengths of a heat-actuated fuse cord 21 can be helically wound in at least one direction around the outside of the vessel 22, together with tows of resin embedded fibers. Free ends of the fuse cord 21 are left extending beyond the body of the vessel 22 for thermal coupling to the TPRD 23 located in an open, boss end 40 of the vessel 22. The fiber-reinforced vessel 22 is allowed to air dry and the resin is heat cured at temperatures below the ignition temperature of the fuse cord 21, to harden and strengthen the outer resin layer of the vessel 22.

IN USE

In one embodiment, a fuel vessel 22 is equipped with the thermally responsive remote triggering system of the present invention. Fuse cord 21 is positioned in the proximity of the vessel 22 and is thermally coupled with the vessel's TPRD 23. When excessive heat is experienced anywhere in the proximity of the vessel 22 and the temperature reaches the cord's 21 ignition temperature, the fuse cord 21 ignites and burns rapidly away from the point of ignition, quickly reaching the thermal actuator 24 of the TPRD 23.

In the case of a TPRD 23 equipped with a frangible bulb 25 thermal actuator, the fuse cord 21 transfers its heat to the frangible bulb 25 causing the temperature sensitive liquid 28 in the bulb 25 to expand to the point that the bulb 25 fractures, releasing pressure in the vessel 22, releasing the vessel's contents either into the atmosphere or through a conduit to a position away from the heat, minimizing the hazard.

The embodiments of the invention for which an exclusive property or privilege is claimed are defined as follows:

1. A thermally responsive triggering system for a pressure vessel comprising:

a thermally actuated pressure relief device in communication with the interior of the vessel and having a thermal actuator; and a length of thermally-actuated fuse cord positioned in the proximity of the vessel and being thermally coupled to the thermal actuator.

2. The system as described in claim 1 wherein the thermally-actuated fuse cord is positioned about the surface of the pressure vessel.

3. The system as described in claim 1 wherein the thermally-actuated fuse cord is positioned adjacent the surface of the pressure vessel.

4. The system as described in claim 1 wherein the thermally-actuated fuse cord is positioned along insulation wrapped around the surface the pressure vessel.

5. The system as described in claim 2 wherein the thermally-actuated fuse cord is helically wound around the surface of the pressure vessel.

6. The system as described in claim 1 wherein the thermal actuator is a thermally-responsive frangible bulb fuse.

7. The system as described in claim 1 wherein the thermally-actuated fuse cord is pyrotechnic cord.

8. The system as described in claim 1 further comprising an intermediate initiator through which the fuse cord is thermally coupled to the thermal actuator.

9. The system as described in claim 8 wherein the intermediate initiator is a combustible charge capable of providing sufficient heat for a duration so as to trigger the thermal actuator.

10. A method of fitting a vessel having a thermal-pressure relief valve with remote thermal trigger, the thermal-pressure relief valve having a thermal actuator, the method comprising the steps of:

providing a length of thermally-actuated fuse cord in the proximity of the vessel; and thermally coupling the fuse cord along its length to the relief valve's thermal actuator.

11. The method of claim 10 further comprising securing the fuse cord in the proximity of the vessel.

12. The method of claim 11 wherein the fuse cord is secured in the proximity of the vessel with tape.

13. The method of claim 11 wherein the fuse cord is secured in the proximity of the vessel with an expandable mesh sleeve, the fuse cord interwoven into the mesh.

14. The method of claim 11 wherein the fuse cord is secured in the proximity of the vessel by attachment to a surface of an insulated jacket, the insulated jacket surrounding the vessel.

15. The method of claim 14 wherein the fuse cord is attached to an inner surface of the insulated jacket.

16. The method of claim 14 wherein the fuse cord is attached to an outer surface of the insulated jacket.

17. The method of claim 11 wherein the fuse cord is secured in the proximity of the vessel with resin embedded fibers.

18. A remote thermal triggering kit for a pressure vessel having a thermal-pressure relief valve having a thermal actuator, the kit comprising the following components in packaged form:

one or more lengths of thermally-actuated fuse cord; and means for thermally coupling the fuse cord to the thermal actuator.

19. The remote thermal triggering kit of claim 18 further comprising an intermediate initiator;

means for thermally coupling the fuse cord to the intermediate initiator; and means for thermally coupling the intermediate initiator to the thermal actuator.

20. The remote thermal triggering kit of claim 19 wherein the intermediate initiator is a combustible charge capable of providing sufficient heat for a duration so as to trigger the thermal actuator.

21. The remote thermal triggering kit of claim 19 further comprising means for securing the fuse cord in the proximity of the vessel.

22. The remote thermal triggering kit of claim 21 wherein the securing means is tape.

23. The remote thermal triggering kit of claim 21 wherein the securing means is an expandable mesh sleeve, the fuse cord interwoven in the mesh sleeve in a plurality of patterns.

24. A remote thermal triggering kit for a pressure vessel having a thermal-pressure relief valve having a thermal actuator, the kit comprising the following components in packaged form:

one or more lengths of thermally-actuated fuse cord; and tape for securing the fuse cord in the proximity of the vessel.

25. A remote thermal triggering kit for a pressure vessel having a thermal-pressure relief valve having a thermal actuator, the kit comprising the following components in packaged form:

one or more lengths of thermally-actuated fuse cord; and an expandable mesh sleeve for securing the fuse cord in the proximity of the vessel, the fuse cord interwoven into the mesh.

\* \* \* \* \*